No. 809,881. PATENTED JAN. 9, 1906.
W. WRIGHT.
VEHICLE WHEEL.
APPLICATION FILED FEB. 20, 1905.
2 SHEETS—SHEET 1.
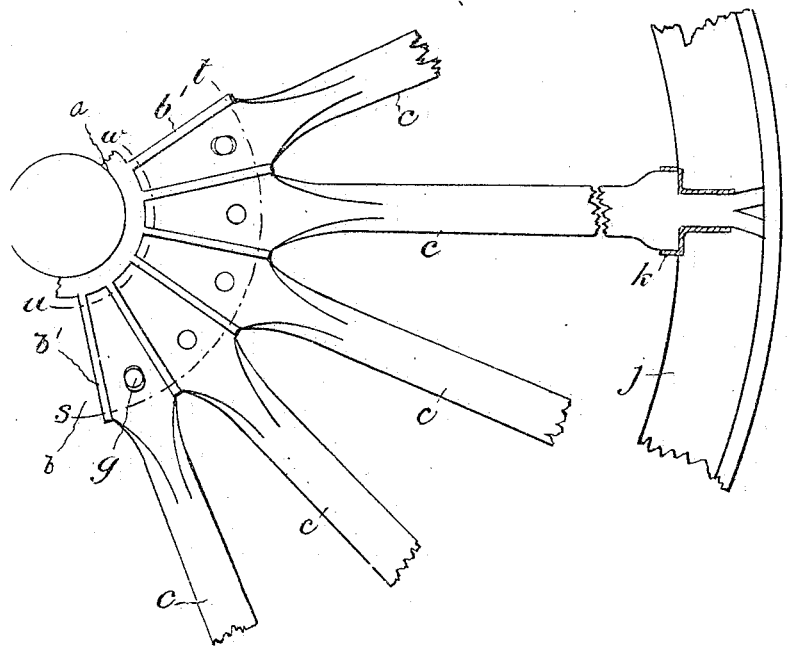
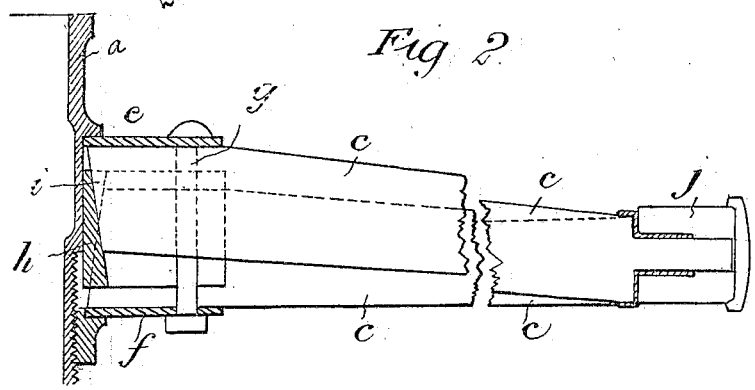
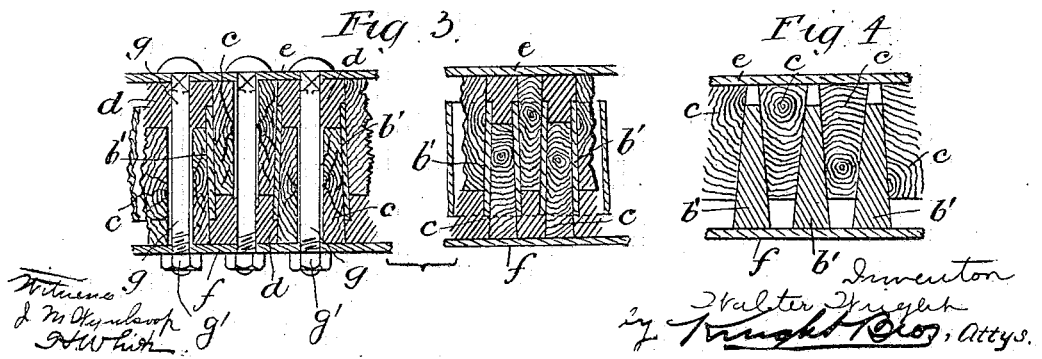

No. 809,881.

PATENTED JAN. 9, 1906.

W. WRIGHT.
VEHICLE WHEEL.
APPLICATION FILED FEB. 20, 1905.

2 SHEETS—SHEET 2.

Witnesses
J. M. Kuykoop.
J. H. White.

Inventor
Walter Wright
by Knight Bros., Attys.

UNITED STATES PATENT OFFICE.

WALTER WRIGHT, OF GLASGOW, SCOTLAND, ASSIGNOR TO S. STEVENSON & COMPANY, OF GLASGOW, SCOTLAND.

VEHICLE-WHEEL.

No. 809,881.     Specification of Letters Patent.     Patented Jan. 9, 1906.

Application filed February 20, 1905. Serial No. 246,629.

*To all whom it may concern:*

Be it known that I, WALTER WRIGHT, foreman at S. Stevenson & Company, Polmadie Saw Mills, Rutherglen road, residing at Glasgow, Scotland, have invented certain new and useful Improvements in the Construction of Vehicle-Wheels and Like Wooden Wheels, of which the following is a specification.

This invention, which relates to the construction of wheels, has special reference to the hub of what is known in the trade as "artillery-pattern" wheels, and has for its object to tighten up the tire and mitered ends of the spokes without the necessity of removing these from the wheel, which is at present the case.

Figure 5:
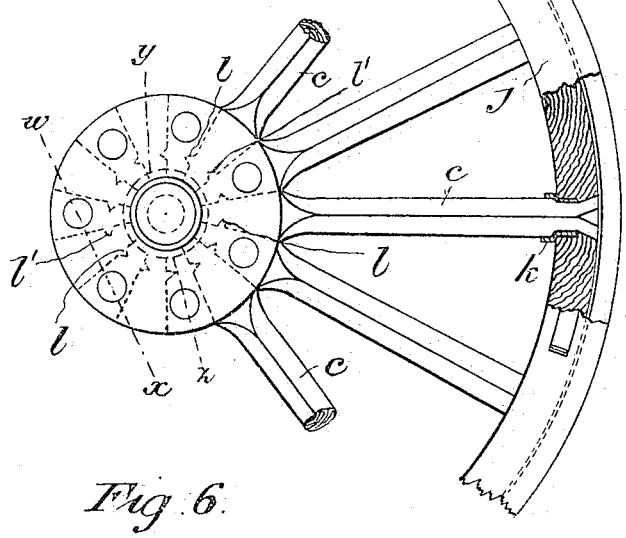
Figure 6:
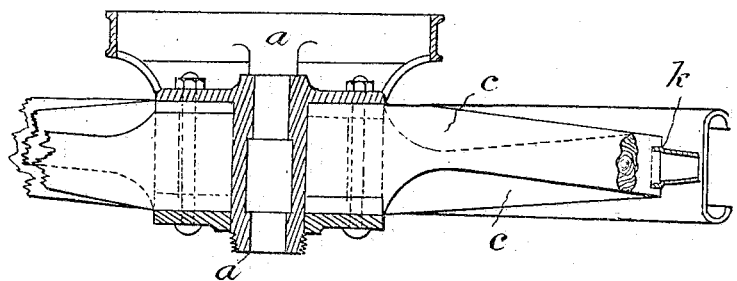
Figures 7, 8:
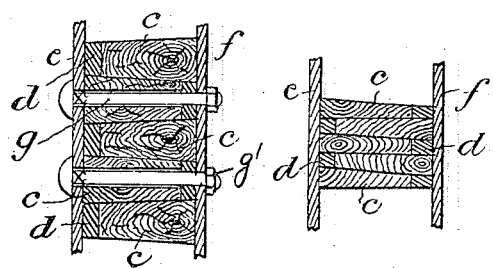

Figure 1 is a view, partly in section and partly in elevation, of the hub and tire of a wheel embodying my invention. Fig. 2 is a longitudinal elevation of the same, partly in section. Fig. 3 illustrates sections taken through the hub on the lines $s\,t$ and $u\,w$, Fig. 1. Fig. 4 is a section illustrating an alternative method, taken through the hub of an ordinary straight-spoke wheel. Fig. 5 is a similar view to Fig. 1, but with the hub in elevation. Fig. 6 is a longitudinal section of the same. Figs. 7 and 8 are sections taken through the hub on the lines $w\,x$ and $y\,z$, respectively, of Fig. 5.

The hub $a$ consists of a malleable casting constructed in the manner shown and comprises a series of wedge-shaped pockets or receptacles $b$ for the reception of the ends of the spokes $c$. In each of the pockets $b$ is laterally interposed a piece of india-rubber fiber or other elastic or non-elastic packing $d$, as seen more particularly in Figs. 3, 7, and 8. The hub is embraced laterally on either side by two separate flanges $e\,f$. The said flanges are held in position by bolts $g$, passing transversely through the body of the said spokes $c$.

With reference to Figs. 1 to 4, the internal portion of the casting constituting the hub $a$ immediately surrounding the bush is formed with inclined surfaces $h\,i$, alternately inclined, as seen in Fig. 2. By means of tightening up the bolts $g$ by the nuts $g'$ the bottom of the spokes $c$ travels up the inclined planes $h\,i$ aforesaid of the casting, which operation causes the position of the spokes $c$ to extend laterally or outward, which tightens up the felly $j$. Under an alternative method the webs or partition-walls $b'$ of the malleable casting are tapered laterally—that is to say, from back to front—in which case the ends of the spokes $c$ are correspondingly tapered. This modification is illustrated in Fig. 4.

Figs. 5 to 8 illustrate the method of dispensing with the partition-walls $b'$, which form the wedge-shaped pockets or receptacles $b$. In this case the ends of the spokes $c$ are formed with a right angle or curved extension, as seen in Fig. 6, and with a double miter or taper whose surfaces fit close together, as seen in Fig. 7, and in such manner that by tightening up the nave-bolts $g$ after withdrawing sufficient of the fiber packing-sections $d$ the spokes will be laterally extended or pressed out toward the felly, after the manner of the arrangement illustrated in Figs. 1 to 4. At the point where the ends of the spokes $c$ fit into the felly $j$ a metal ferrule $k$ surrounds the spoke at the junction, as seen in Figs. 1, 2, 5, and 6, and thereby strengthens the tang of the spoke. The end of each spoke is provided with a V-shaped projection $l$ on one side and with a V-shaped recess or indentation $l'$ on the other side. Each projection $l$ engages with the recess $l'$ of the adjacent spoke.

I claim—

In a wheel, the combination of a hub provided with a plurality of radial wedge-shaped pockets having inclined bottom surfaces, flanges surrounding the hub and forming the sides of said pockets, a spoke in each of said pockets, packing-pieces interposed alternately between the sides of the spokes and the flanges, and means for securing the flanges together.

In witness whereof I have hereunto set my hand in the presence of two witnesses.

WALTER WRIGHT.

Witnesses:
   JAME ALLAN,
   JAMES PATRICK.